US011334591B2

(12) United States Patent
Liu et al.

(10) Patent No.: US 11,334,591 B2
(45) Date of Patent: May 17, 2022

(54) MULTI-LANGUAGE OBJECT CACHE

(71) Applicant: Palantir Technologies Inc., Palo Alto, CA (US)

(72) Inventors: Jeremy Liu, New York, NY (US); David Vogelbacher, New York, NY (US); Eoin Morgan, Mountain View, CA (US); Helen Yu, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 68 days.

(21) Appl. No.: 16/600,409

(22) Filed: Oct. 11, 2019

(65) Prior Publication Data

US 2021/0049182 A1 Feb. 18, 2021

Related U.S. Application Data

(60) Provisional application No. 62/886,810, filed on Aug. 14, 2019.

(51) Int. Cl.
| | | |
|---|---|---|
| *G06F 16/25* | (2019.01) | |
| *G06F 16/23* | (2019.01) | |
| *G06F 9/54* | (2006.01) | |

(52) U.S. Cl.
CPC ............ *G06F 16/254* (2019.01); *G06F 9/541* (2013.01); *G06F 16/2379* (2019.01)

(58) Field of Classification Search
CPC ....... G06F 16/254; G06F 16/278; G06F 16/30
See application file for complete search history.

(56) References Cited

U.S. PATENT DOCUMENTS

| | | | |
|---|---|---|---|
| 2003/0014556 A1* | 1/2003 | Conway ................. | G06F 9/548 719/316 |
| 2010/0114628 A1* | 5/2010 | Adler ................... | G06Q 10/063 705/7.11 |

(Continued)

FOREIGN PATENT DOCUMENTS

EP          3258440          12/2017

OTHER PUBLICATIONS

Extended European Search Report, for EP Application No. EP19217442 dated Jul. 10, 2020, 12 pages.

(Continued)

*Primary Examiner* — Apu M Mofiz
*Assistant Examiner* — Farhad Agharahimi
(74) *Attorney, Agent, or Firm* — Sheppard Mullin Richter & Hampton LLP

(57) ABSTRACT

Systems and methods are provided for providing an interface for accessing a data analysis workbook through which data can be accessed and manipulated using a plurality of programming languages and application programming interfaces (APIs). Input data on which one or more data transformations are to be performed within the data analysis workbook can be accessed, wherein the input data corresponds to a first object representation of a dataset, and wherein the one or more data transformations require the dataset to be a different, second object representation of the dataset. The second object representation of the dataset can be extracted from the first object representation of the dataset through a first language delegate that manages data associated with the first object representation. The one or more data transformations can be applied to the extracted second object representation of the dataset through a different, second language delegate that manages data associated with the second object representation.

20 Claims, 10 Drawing Sheets

(56) References Cited

U.S. PATENT DOCUMENTS

| | | | |
|---|---|---|---|
| 2014/0114907 A1* | 4/2014 | Kozina | G06F 16/254 |
| | | | 707/602 |
| 2016/0012350 A1 | 1/2016 | Narayanan et al. | |
| 2016/0232169 A1* | 8/2016 | Archak | G06F 16/134 |
| 2017/0090893 A1 | 3/2017 | Aditya et al. | |
| 2019/0228002 A1* | 7/2019 | Nguyen | G06F 16/28 |

OTHER PUBLICATIONS

Salucci et al., "Lightweight Multi-language Bindings for Apache Spark", Pervasive: International Conference on Pervasive Computing: Lecture Notes in Computer Science, Aug. 9, 2016, pp. 281-292.

* cited by examiner

MULTI-LANGUAGE OBJECT CACHE

CROSS REFERENCE TO RELATED APPLICATIONS

This application claims the benefit under 35 U.S.C. § 119(e) of U.S. Provisional Application No. 62/886,810, filed Aug. 14, 2019, the content of which is incorporated by reference in its entirety into the present disclosure.

FIELD OF THE INVENTION

This disclosure relates to approaches for improving interoperability between different data analysis workbooks that use incompatible programming languages or application programming interfaces.

BACKGROUND

Users of a data platform system can analyze and manipulate data using a system comprising distributed computing engines for processing and analyzing large amounts of data, such as Apache Spark. In general, users need to provide instructions for analyzing and manipulating data using application programming interfaces (APIs) that are specific to programming languages, such as Python, R, and SQL. However, due to limitations under conventional approaches, users are typically prevented from accessing and sharing information (e.g., data, code) across different programming languages and APIs.

SUMMARY

Various embodiments of the present disclosure can include systems, methods, and non-transitory computer readable media configured to provide an interface for accessing a data analysis workbook through which data can be accessed and manipulated using a plurality of programming languages and application programming interfaces (APIs). Input data on which one or more data transformations are to be performed within the data analysis workbook can be accessed, wherein the input data corresponds to a first object representation of a dataset, and wherein the one or more data transformations require the dataset to be a different, second object representation of the dataset. The second object representation of the dataset can be extracted from the first object representation of the dataset through a first language delegate that manages data associated with the first object representation. The one or more data transformations can be applied to the extracted second object representation of the dataset through a different, second language delegate that manages data associated with the second object representation.

In an embodiment, a language delegate is associated with a programming language, and wherein the language delegate is configured to cache objects that are compatible with the programming language.

In an embodiment, the language delegate is configured to convert objects that are compatible with the programming language to different objects that are compatible with different programming languages or APIs.

In an embodiment, different language delegates manage different object representations of a same object, and wherein the different object representations reference a same base object stored by a global dataset store.

In an embodiment, the systems, methods, and non-transitory computer readable media are configured to determine that the first object representation of the dataset is cached by the first language delegate based at least in part on a global object cache and provide a request to the first language delegate to convert the first object representation of the dataset to the second object representation of the dataset.

In an embodiment, the systems, methods, and non-transitory computer readable media are configured to provide the second object representation of the dataset to the second language delegate for caching.

In an embodiment, the global object cache maintains information describing objects cached by at least the first language delegate and the second language delegate.

In an embodiment, applying the one or more data transformations to the extracted second object representation of the dataset further comprises providing an instruction to the second language delegate to execute the one or more data transformations based on the second object representation of the dataset, wherein the second object representation is accessed from a local cache managed by the second language delegate.

In an embodiment, the data analysis workbook supports at least a PySpark API, a pandas API, a SparkR API, and a Spark SQL (or Spark_SQL) API.

In an embodiment, the data analysis workbook supports at least a Python programming language, an R programming language, and an SQL programming language.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1A:
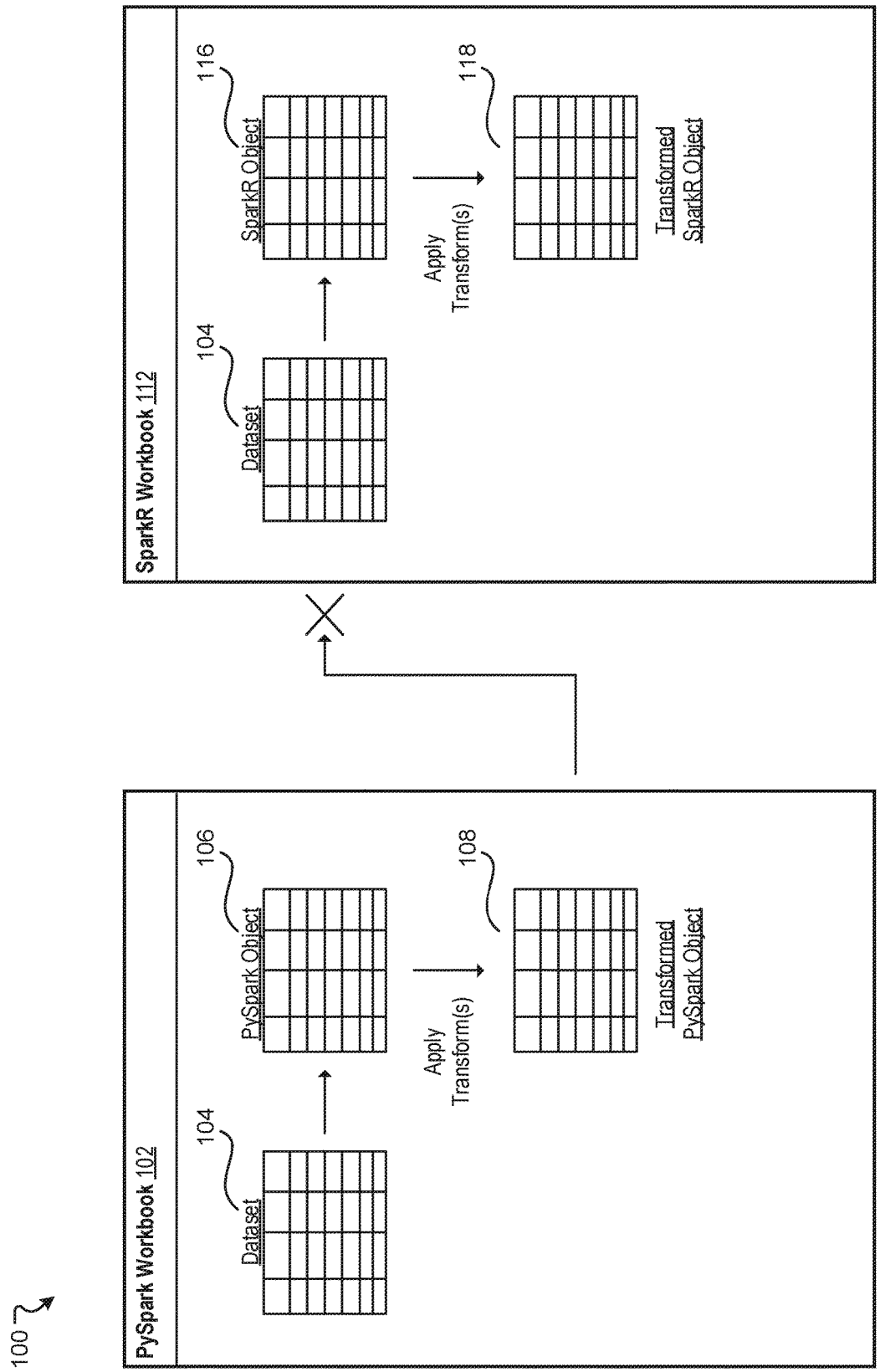
FIGS. 1A-1B illustrate example interfaces, in accordance with various embodiments.

Users of a data platform system can analyze and manipulate data using various operations as implemented in data analysis workbooks. Conventionally, each workbook can support a single programming language and framework for processing and analyzing large amounts of data through a distributed system, such as Apache Spark. For example, a PySpark workbook can support the Python programming language and a PySpark application programming interface (API) for analyzing and manipulating data through Apache Spark. In this example, the PySpark workbook can access data from a data store (e.g., a database table) and can convert that data to a format recognized by the PySpark API (e.g., a PySpark dataframe, object). The PySpark workbook can include various operations for analyzing and manipulating the data as a PySpark dataframe. In contrast, a SparkR workbook can support the R programming language and a SparkR API for processing data through Apache Spark. In this example, the SparkR workbook can access the data from the datastore (e.g., a database table) and can convert that data to a format recognized by the SparkR API (e.g., a SparkR dataframe). Similarly, the SparkR workbook can include various operations for analyzing and manipulating the data as a SparkR dataframe. Under conventional approaches, restricting workbooks to a particular programming language and framework can prevent users from sharing information (e.g., data objects, code snippets, code templates) between different types of workbooks. This limitation can result in users having to perform additional operations to force compatibility between workbooks. For example, users may need to write repeated snippets of code to coerce dataframes associated with one type of API framework to be recognized and processed using a different type of API framework. For instance, a user accessing a pandas workbook may need to write code to convert pandas dataframes to PySpark dataframes to ensure their compatibility. Such conventional approaches suffer from a number of drawbacks. First, these conventional approaches fail to provide a unified, consistent type space of supported languages and object classes. Second, these approaches fail to provide a consistent user experience around supported object classes and accept interconversions. Third, these conventional approaches require a forced separation between PySpark and pandas workbook types, which both rely on the Python programming language. For example, FIG. 1A illustrates an example 100 of a first type of workbook 102 and a different, second type of workbook 112. In this example, the first type of workbook 102 corresponds to a PySpark workbook that relies on the Python programming language and the PySpark API framework while the second type of workbook 112 corresponds to a SparkR workbook that relies on the R programming language and the SparkR API framework. In FIG. 1A, a dataset 104 can be accessed from a datastore for analysis and manipulation using the PySpark workbook 102. Under conventional approaches, the PySpark workbook 102 is typically compatible with data read as PySpark dataframes but not with other types of objects, such as pandas and SparkR dataframes. Accordingly, the PySpark workbook 102 can read the dataset 104 as a PySpark dataframe 106. A user interacting with the PySpark workbook 102 can apply code or transformations to the PySpark dataframe 106 to output a transformed PySpark dataframe 108. Under conventional approaches, the outputted PySpark dataframe 108 can be read and processed by other PySpark workbooks but not with workbooks that rely on different programming languages and/or API frameworks. For instance, the outputted PySpark dataframe 108 is not compatible with the SparkR workbook 112 that relies on the R programming language and the SparkR API framework. As a result, a user seeking to access and manipulate the transformed PySpark dataframe 108 within the SparkR workbook 112 would not be permitted to do so. Instead, the user may need to recreate the PySpark dataframe 108 as a SparkR dataframe through the SparkR workbook 112 before the PySpark dataframe 108 can be processed using the R programming language and the SparkR API. For example, the dataset 104 may be read as a SparkR dataframe 116 within the SparkR workbook 112. Once read, similar transformations can be applied to the SparkR dataframe 116 to produce a SparkR dataframe 118 on which operations can be performed using the R programming language and the SparkR API. In another example, a user seeking to access and manipulate the transformed PySpark dataframe 108 within the SparkR workbook 112 may need to write snippets of code that convert (or wrap) the PySpark dataframe 108 to a SparkR dataframe. Such conventional approaches are undesirable because they introduce barriers that prevent interoperability between workbooks of different programming languages and/or API frameworks, thereby limiting collaboration between users of different programming languages and/or API frameworks.

Figure 1B:
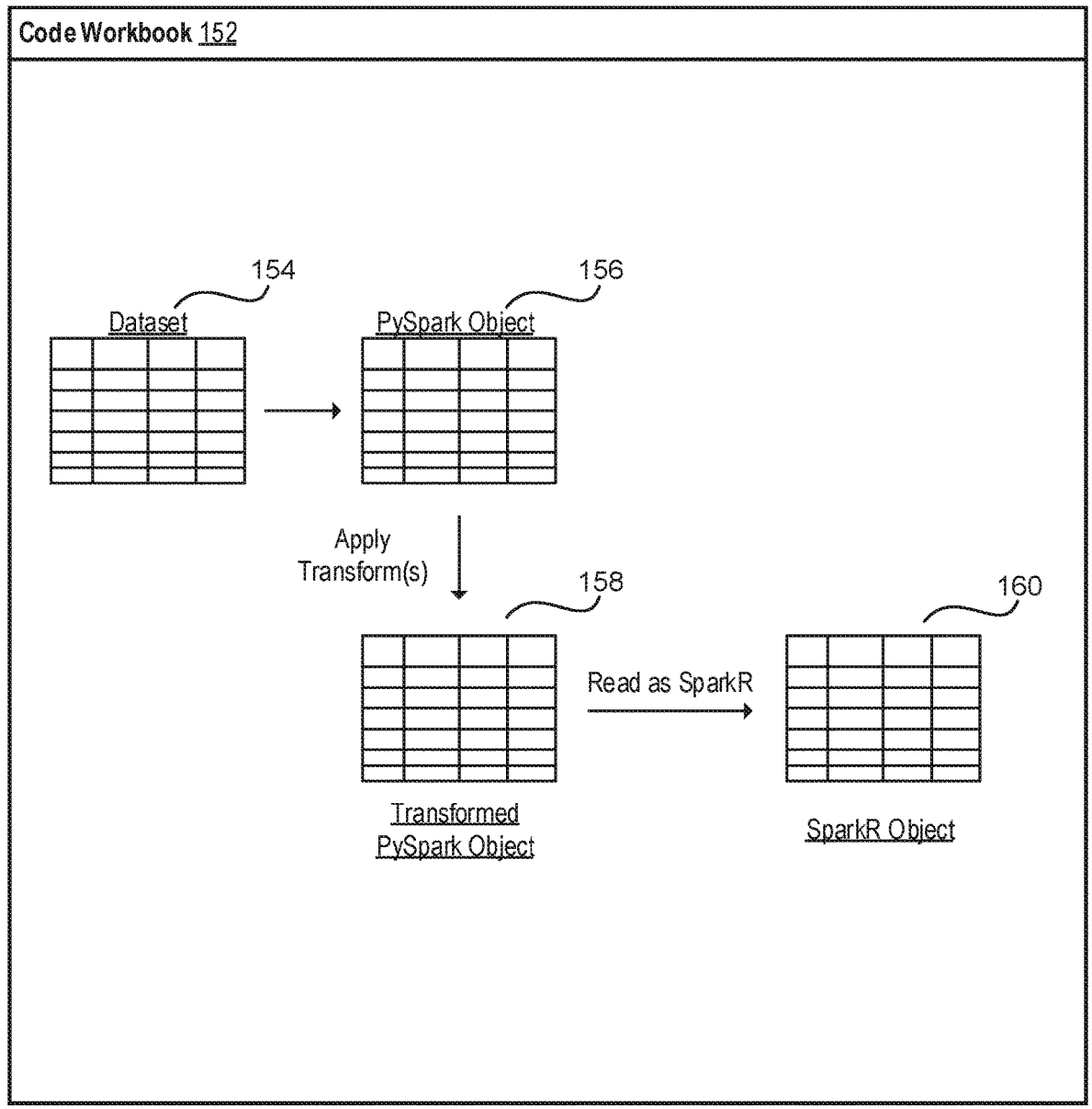

A claimed solution rooted in computer technology overcomes problems specifically arising in the realm of computer technology. In various embodiments, data analysis workbooks are permitted to access and manipulate data regardless of which programming language or API framework being used. That is, a user interacting with a data analysis workbook can access and manipulate various data objects irrespective of programming language (e.g., Python, R, SQL, etc.) or data type (e.g., PySpark, pandas, SparkR, Spark_SQL, etc.). For example, FIG. 1B illustrates an example 150 of a code workbook 152 through which a user can access and analyze different representations of data. The workbook 152 can permit interoperability between different programming languages and API frameworks. For example, a dataset 154 (e.g., a database table) can be accessed from a datastore for analysis and manipulation using the code workbook 152. The dataset 154 may be read as a PySpark dataframe 156 on which various transformations can be applied using the Python programming language to produce a transformed PySpark dataframe 158. In various embodiments, the PySpark dataframe 158 can be accessed as a different type of object which can be shared with other users and workbooks regardless of their compatibility with the Python programming language or the PySpark API. For example, in FIG. 1B, the user interacting with the code workbook 152 may decide to apply a template-based transformation to the PySpark dataframe 158. In this example, the template-based transformation may be created using the R programming language and the SparkR API. Here, the user can select an option to read the PySpark dataframe 158 as a SparkR dataframe 160 on which the template-based transformation associated with the R programming language can be applied. The claimed solution thus permits users to seamlessly access and manipulate different representations of data across disparate programming languages and API frameworks, which would typically not be permitted under conventional approaches.

Figure 2:
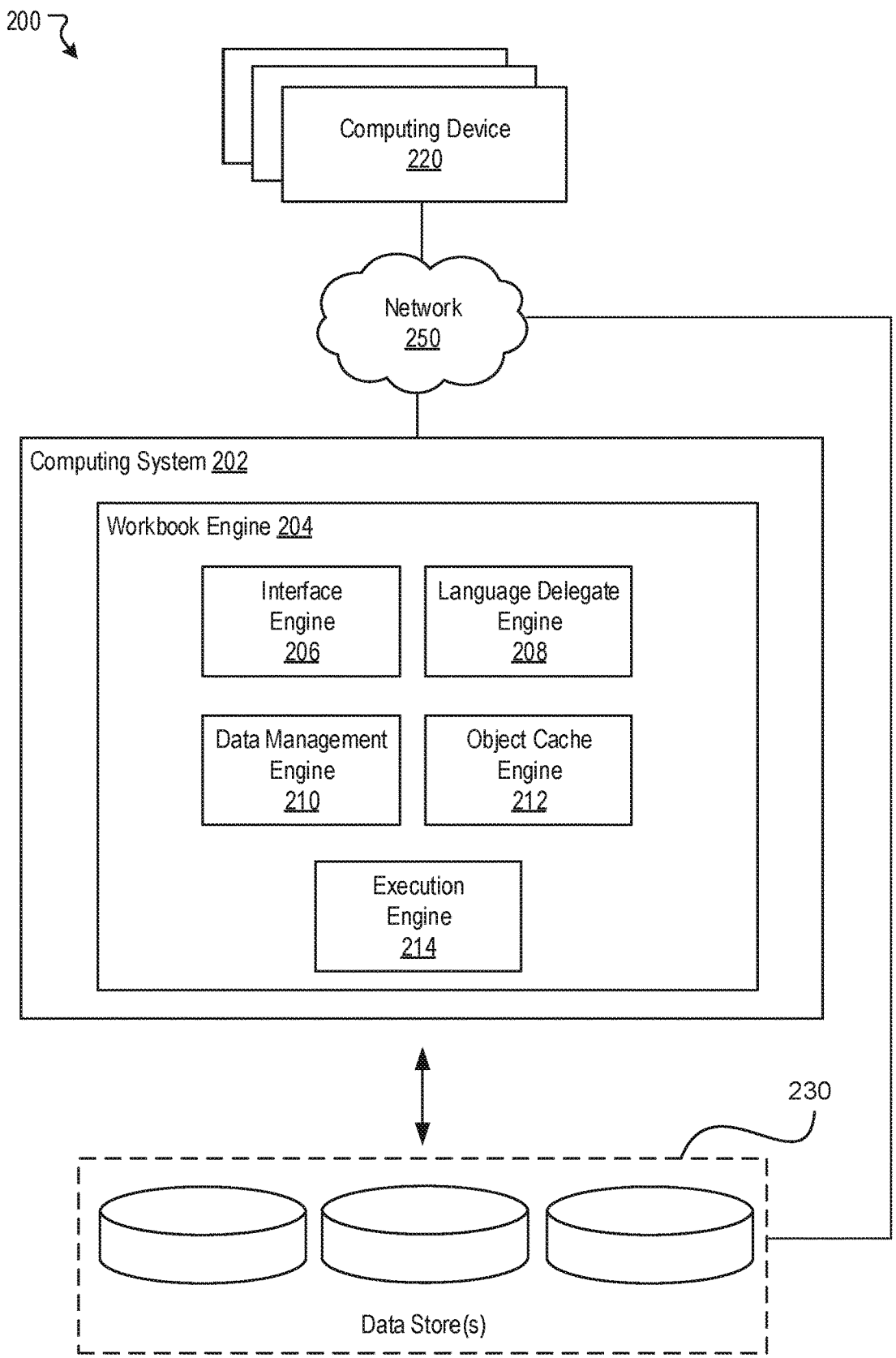
FIG. 2 illustrates an example computing environment, in accordance with various embodiments.

FIG. 2 illustrates an example environment 200, in accordance with various embodiments. The example environment 200 can include at least a computing system 202 and at least one computing device 220. The computing system 202 and the computing device 220 can each include one or more processors and memory. The processors can be configured to perform various operations by interpreting machine-readable instructions. The computing system 202 can access one or more data stores 230. In general, a data store may be any device in which data can be stored and from which data can be retrieved. In some embodiments, the data stores 230 may store and manage various data as raw data, datasets, database tables based on some schema, or as objects in one or more object graphs. In some embodiments, an object graph may be made up of a number of objects that serve as containers for data. The object graph can also identify various relationships between objects, for example, using edges (or links) that connect objects. Each object can include a number of object components including, for example, a properties component that includes structured pieces of information, a media component that includes binary attachments of data (e.g., text documents, images, videos, etc.), a notes component (e.g., a free text container), and one or more respective links (or edges) that associate the object with other objects in the object graph. In some instances, the object graph can include different types of objects. For example, an object may represent an entity (e.g., person(s), place(s), thing(s), etc.), an activity (e.g., event, incident, etc.), a document, or multimedia, to name some examples. The computing system 202, the computing device 220, and the data stores 230 may be accessible either directly or over a network 250. The network 250 may be any wired or wireless network through which data can be sent and received (e.g., the Internet, local area network, etc.). The computing system 202 can be configured to process requests received from the computing device 220. For example, the requests may be generated by a user operating the computing device 220 or from software applications running on the computing device 220. In various embodiments, such requests can be for interacting with one or more data analysis workbooks, as provided by a workbook engine 204. In various embodiments, the workbook engine 204 can include an interface engine 206, a language delegate engine 208, a data management engine 210, an object cache engine 212, and an execution engine 214. The interface engine 206, language delegate engine 208, data management engine 210, object cache engine 212, and execution engine 214 can be executed by the processor(s) of the computing system 202 to perform various operations. In general, the interface engine 206, language delegate engine 208, data management engine 210, object cache engine 212, and execution engine 214 can be implemented, in whole or in part, as software that is capable of running on one or more computing devices or systems. In one example, the interface engine 206, language delegate engine 208, data management engine 210, object cache engine 212, and execution engine 214 may be implemented as or within a software application running on one or more computing devices (e.g., user or client devices) and/or one or more servers (e.g., cloud servers). In some instances, various aspects of the interface engine 206, language delegate engine 208, data management engine 210, object cache engine 212, and execution engine 214 may be implemented in one or more computing systems and/or devices.

Figure 3A:
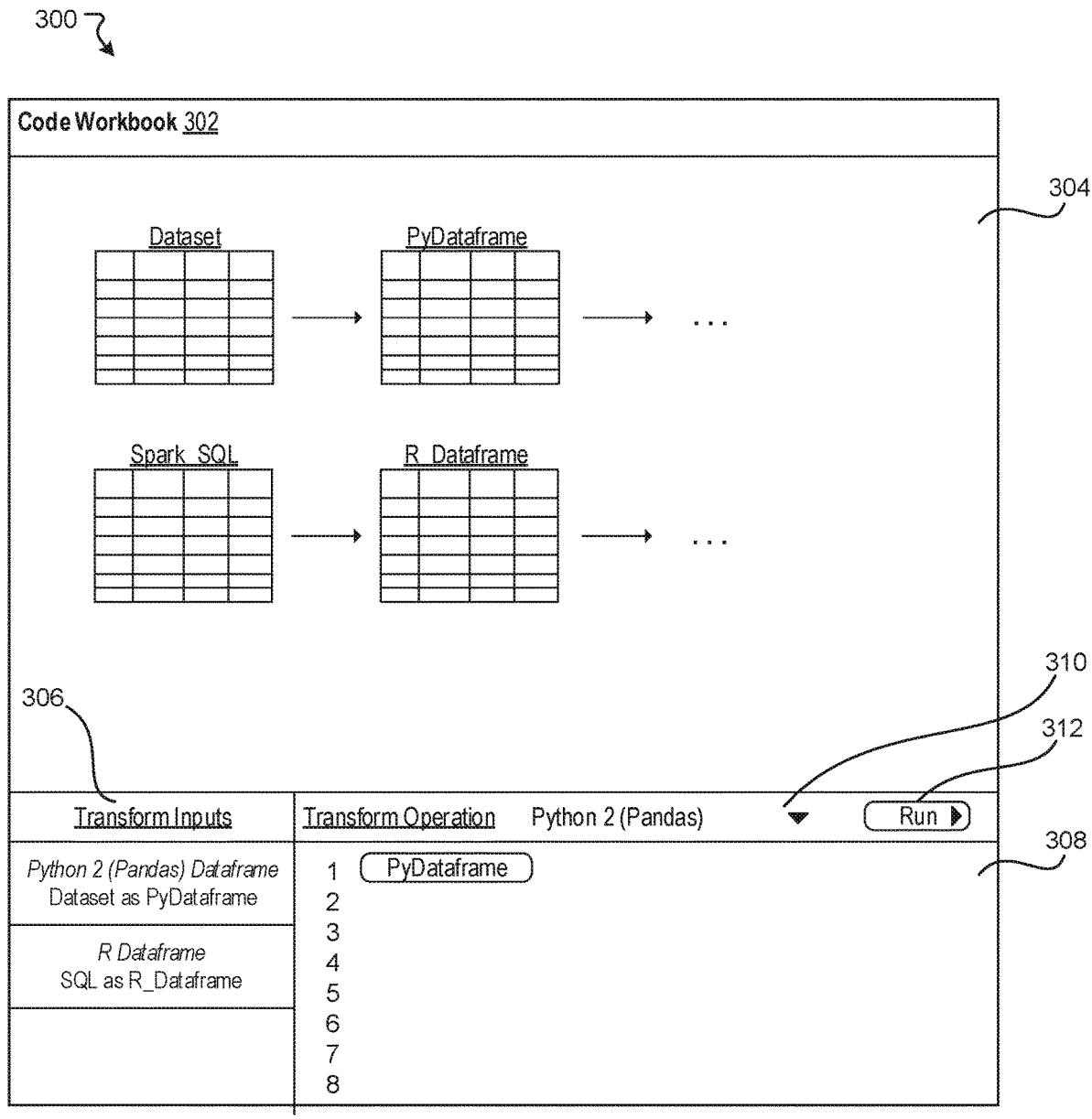
FIGS. 3A-3E illustrate example diagrams, in accordance with various embodiments.

The interface engine 206 can be configured to generate and provide an interface (e.g., graphical user interface) through which various information can be accessed and visualized. For example, the interface engine 206 can provide an interface 302 as shown in the example 300 of FIG. 3A. The interface 302 can be accessed using a software application (e.g., data analysis application, web browser, etc.) running on the computing system 202 and through a display screen associated with the computing system 202. In some embodiments, the interface 302 can be accessed through a software application running on the computing device 220 which permits user interaction with one or more workbooks stored and accessible through the computing system 202 over one or more networks. The interface 302 can provide users with the ability to access and manipulate various types of data that would otherwise not be compatible with one another. For example, a user interacting with the interface 302 can access different types of data objects, such as PySpark dataframes, pandas dataframes, SparkR dataframes, and Spark_SQL dataframes, to name some examples. As shown, the interface 302 includes at least a first region 304 for visualizing and manipulating data. The interface 302 also includes a second region 306 for accessing inputs (e.g., datasets) as various objects (e.g., PySpark objects, pandas objects, SparkR objects, Spark_SQL objects, etc.). Further, the interface 302 includes a third region 308 for inputting or providing code (or code templates) to be applied to various types of objects. In some embodiments, the third region 308 can provide options 310 for selecting different programming languages and APIs that can be used to access and manipulate data. For example, a user of the interface 302 can select between the Python, R, and SQL programming languages. Further, the user of the interface 302 can select between the PySpark, pandas, SparkR, and Spark_SQL APIs. Naturally, the interface 302 and underlying technologies can be adapted to support other programming languages and APIs. The user can also select a run option 312 to execute code (or code templates) written in various programming languages on objects of various types. For instance, the user can access a Spark_SQL object representation of a given dataset as a SparkR object. The user can then execute code (or code templates) written in the R programming language on the SparkR object. Many variations are possible. In various embodiments, the interface 302 is supported by a number of language delegates that each manage data and conversions related to a particular programming language and/or API framework, as described below in reference to the language delegate engine 208. These language delegates permit interoperability between different programming languages and representations of data that would otherwise not be compatible with one another.

Figure 3B:
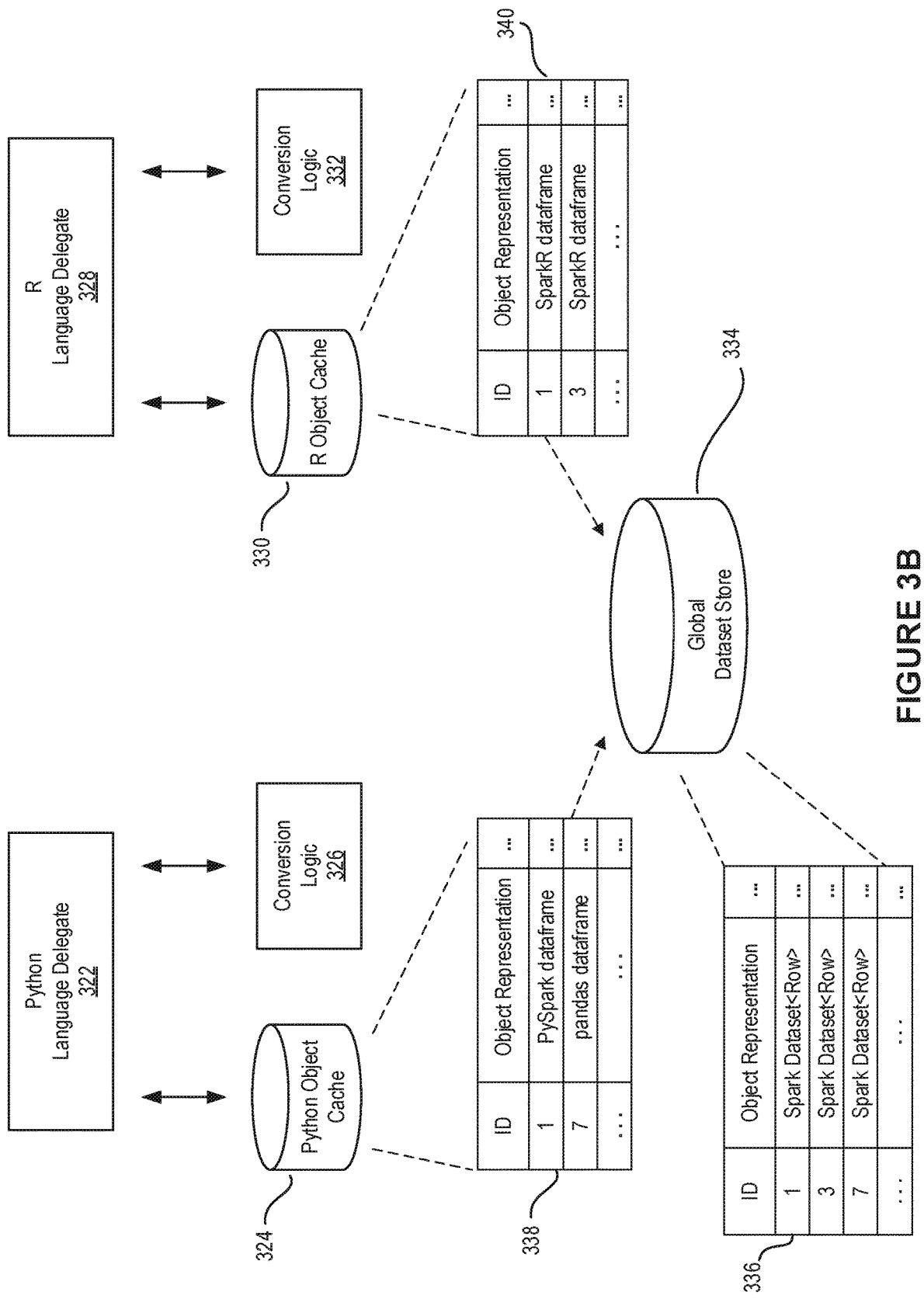

The language delegate engine 208 can be configured to manage language delegates for each supported programming language (e.g., Python, R, SQL, etc.) to permit interoperability between different programming languages and representations of data (e.g., PySpark, pandas, SparkR, and Spark_SQL objects). In some embodiments, each language delegate maintains a respective key-value object store of native data objects as well as conversion logic to convert between different types of native data objects. For example, as illustrated in the example of FIG. 3B, a Python language delegate 322 associated with the Python programming language can maintain a key-value object store 324 of cached native data objects, including PySpark dataframes and pandas dataframes. The object store 324 can key objects based on a globally recognized object identifier. Further, each keyed object can be identified based on its object type (e.g., PySpark dataframe, pandas dataframe, etc.). In the example of FIG. 3B, the object store 324 for the Python programming language is shown as having cached at least a first object with an identifier of "1" corresponding to a PySpark dataframe and a second object with an identifier of "7" corresponding to a pandas dataframe. The Python language delegate 322 can also access conversion logic 326 to execute conversions between object types. For example, the conversion logic 326 associated with the Python language delegate 322 can convert an object from a PySpark representation to a pandas representation, a PySpark representation to a SparkR representation, and a PySpark representation to a Spark_SQL representation. For example, the object may be converted to a pandas representation so the object can be processed using the pandas API framework. In another example, the object may be converted to a SparkR representation so the object can be processed using the R programming language and SparkR API framework. In yet another example, the object may be converted to a Spark_SQL representation so the object can be processed using the SQL programming language and Spark_SQL API framework. Many variations are possible. For example, the conversion logic 326 associated with the Python language delegate 322 can also convert an object from a pandas representation to a PySpark representation, a pandas representation to a SparkR representation, and a pandas representation to a Spark_SQL representation. In some embodiments, multiple language delegates may be used to execute conversions between object types. For example, in some embodiments, each language delegate may be associated with conversion logic that permits conversions that are unique to that language delegate. For example, in some embodiments, a Python language delegate may be associated with conversion logic to convert an object from a PySpark representation to a pandas representation, a pandas representation to a PySpark representation, a PySpark representation to a Spark_SQL representation, and a pandas representation to a Spark_SQL representation. Further, an R language delegate may be associated with conversion logic to convert an object from a Spark_SQL representation to a SparkR representation. In this example, an object may be converted from a PySpark representation to a SparkR representation by involving both the Python language delegate and the R language delegate and their respective conversion logic. For example, the Python language delegate can convert the object from a PySpark representation to a Spark_SQL representation. This Spark_SQL representation of the object can be provided to the R language delegate to convert to a SparkR representation. FIG. 3B also illustrates an example R language delegate 328 associated with the R programming language. The R language delegate 328 can maintain a key-value object store 330 of cached native data objects including SparkR dataframes. The object store 330 can key objects based on a globally recognized object identifier and each object can be identified based on its type (e.g., SparkR dataframe). In the example of FIG. 3B, the object store 330 for the R programming language is shown as having cached at least a first object with an identifier of "1" which corresponds to a SparkR dataframe and a second object with an identifier of "3" which also corresponds to a SparkR dataframe. The R language delegate 328 can also access conversion logic 332 to execute conversions between object types. For example, the conversion logic 332 associated with the R language delegate 328 can convert an object from a SparkR representation to a PySpark representation, a SparkR representation to a pandas representation, and a SparkR representation to a Spark_SQL representation. For example, the object may be converted to a PySpark representation so the object can be processed using the Python programming language and the PySpark API framework. In another example, the object may be converted to a pandas representation so the object can be processed using the Python programming language and the pandas API framework. In yet another example, the object may be converted to a Spark_SQL representation so the object can be processed using the SQL programming language and Spark_SQL API framework. Other types of language delegates are contemplated. For example, the language delegate engine 208 can manage an SQL language delegate associated with the SQL programming language. The SQL language delegate can similarly maintain a key-value object store of cached native data objects including Spark_SQL dataframes. The object store can also key objects based on a globally recognized object identifier and each object can be identified based on its type (e.g., Spark_SQL dataframe). The SQL language delegate can also access conversion logic to execute conversions between object types. For example, the conversion logic associated with the SQL language delegate can convert an object from a Spark_SQL representation to a PySpark representation, a Spark_SQL representation to a pandas representation, and a Spark_SQL representation to a SparkR representation. For example, the object may be converted to a PySpark representation so the object can be processed using the Python programming language and the PySpark API framework. In another example, the object may be converted to a pandas representation so the object can be processed using the Python programming language and the pandas API framework. In yet another example, the object may be converted to a SparkR representation so the object can be processed using the R programming language and SparkR API framework. Again, many variations are possible.

In various embodiments, each object representation cached by a language delegate corresponds to data managed by a global dataset store 334, as illustrated in FIG. 3B. The global dataset store 334 can be managed by the data management engine 210. In various embodiments, the global dataset store 334 can store and manage data (or datasets) accessed from various datastores (e.g., the data stores 230 of FIG. 2) as Spark Dataset<Row> objects. In some embodiments, a dataset accessed through a given workbook can be obtained from one or more datastores (e.g., the datastores 320 of FIG. 2) and added to the global dataset store 334 as a Spark Dataset<Row> object. Each language delegate can then access the dataset from the global dataset store 334 as a Spark Dataset<Row> object. In some embodiments, each language delegate can consume Spark Dataset<Row> references from the global dataset store 334 and wrap them in native wrappers so Spark objects can be read as different objects. For example, a user interacting with a workbook may want to read a dataset having an object identifier of "1" for analysis as a PySpark object. In this example, the Python language delegate 322 can access the dataset from the global dataset store 334 as a Spark Dataset<Row> object 336. The Python language delegate 322 can apply a native wrapper to the Spark Dataset<Row> object 336 to produce a PySpark representation 338 of the Spark Dataset<Row> object 336. In another example, a user interacting with a workbook may want to read the dataset having an object identifier of "1" for analysis as a SparkR object. In this example, the R language delegate 328 can access the dataset from the global dataset store 334 as a Spark Dataset<Row> object 336. The R language delegate 328 can apply a native wrapper to the Spark Dataset<Row> object 336 to produce a SparkR representation 340 of the Spark Dataset<Row> object 336. The global dataset store 334 thus provides a centralized location for reading and writing Spark Dataset<Row> objects from data sources (e.g., the data stores 230 of FIG. 2). Each language delegate can rely on the global dataset store 334 when accessing data which helps ensure that all language delegates and their corresponding object representations reference the same base object representation (e.g., Spark Dataset<Row> object). This architecture can also help coordinate dataset cache persistence settings. In various embodiments, any outputs (e.g., transformations, modifications, etc.) generated from base objects (or Spark Dataset<Row> objects) are registered with the data management engine 210

(e.g., object identifier and type) which allows the outputs to be available as inputs for downstream operations and/or writes. In various embodiments, such operations can include transformations that produce new datasets (e.g., map, filter, aggregate, etc.) and actions that trigger some computation and return results (e.g., count, show, etc.). In some embodiments, the data management engine 210 can maintain provenance records for base objects that are imported into the global dataset store from various data sources (e.g., the data stores 230 of FIG. 2).

Figure 3C:
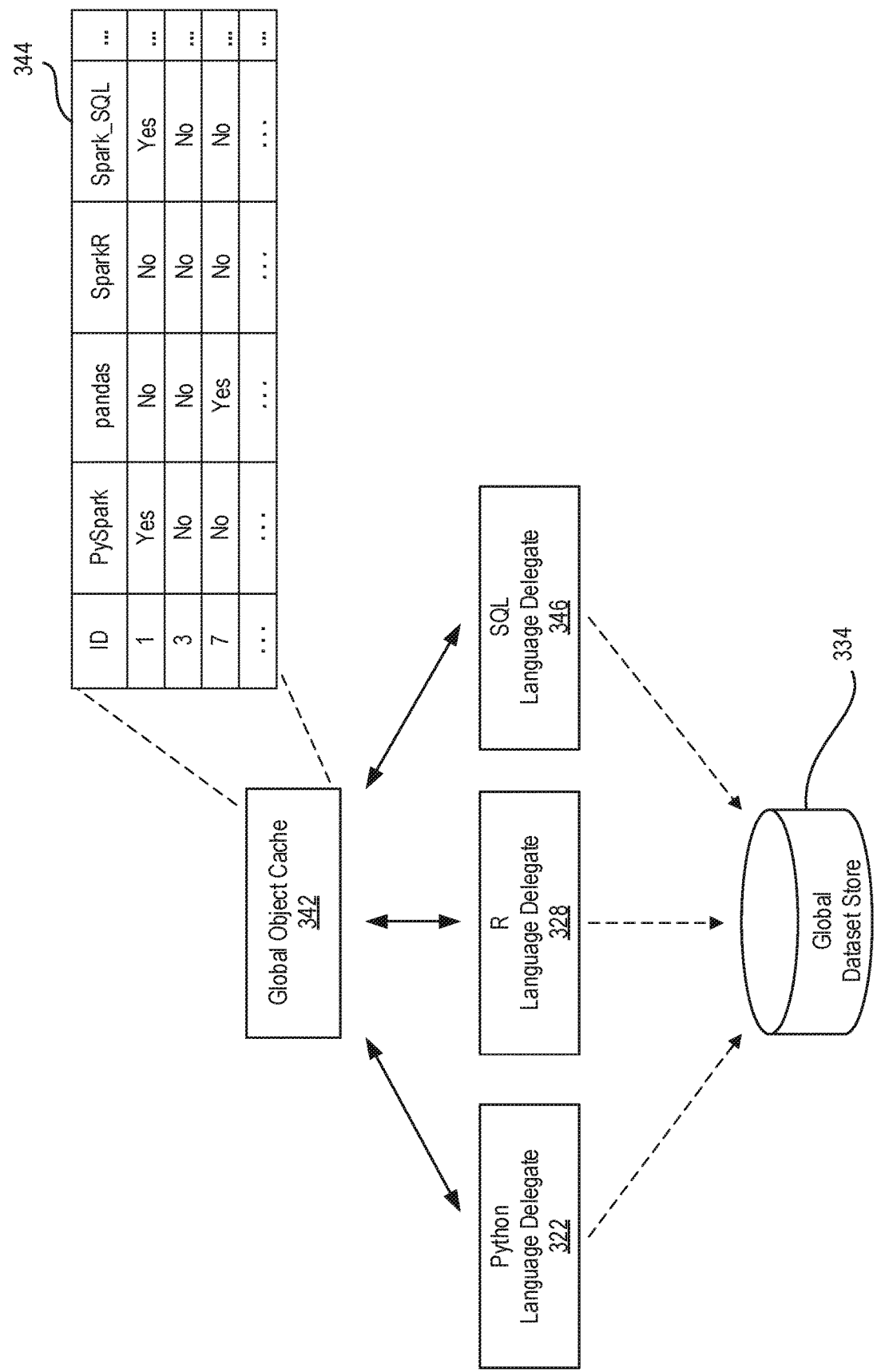

The object cache engine 212 can be configured to manage a global object cache of the various types of objects that are cached independently by language delegates. In various embodiments, the object cache engine 212 can handle all logic associated with cached object lifecycle management. For example, the object cache engine 212 can manage a global object cache 342 which stores example information 344 mapping object identifiers to native objects that are managed by different language delegates, as illustrated in the example of FIG. 3C. For example, the information 344 indicates that a cached PySpark representation of object identifier "1" is available and accessible through the Python language delegate 322 which manages both PySpark and pandas objects. Further, the information 344 indicates that a cached Spark_SQL representation of object identifier "1" is available and accessible through a SQL language delegate 346 which manages Spark_SQL objects. The information 344 also indicates that pandas and SparkR object representations for object identifier "1" are not available through corresponding language delegates. The information 344 is provided merely as an example of the types of information that can be managed by the global object cache 342 and, naturally, variations are contemplated. In various embodiments, the object cache engine 212 can issue commands to individual language delegates through a language-specific bridge. For example, the object cache engine 212 can use Py4J for Python to interact with the Python language delegate 322 and Gateway Server for R to interact with the R language delegate 328. In some embodiments, the object cache engine 212 can handle concurrent access, modification, and eviction of objects included in the global object cache 342. The object cache engine 212 can also mirror such commands through creation, conversion, and deletion calls made to individual language delegates to keep their caches synchronized. For example, the object cache engine 212 can perform such operations using a high-performance caching library, such as the Caffeine library for Java.

Figure 3D:
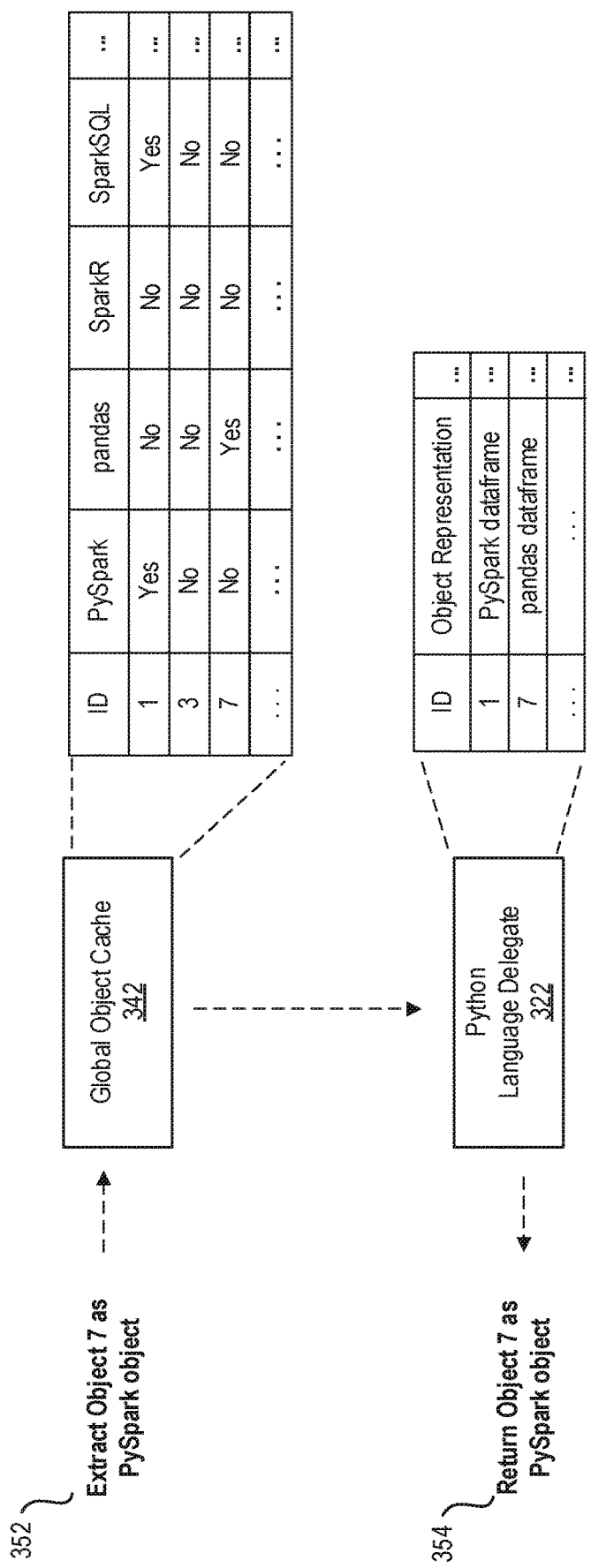
Figure 3E:
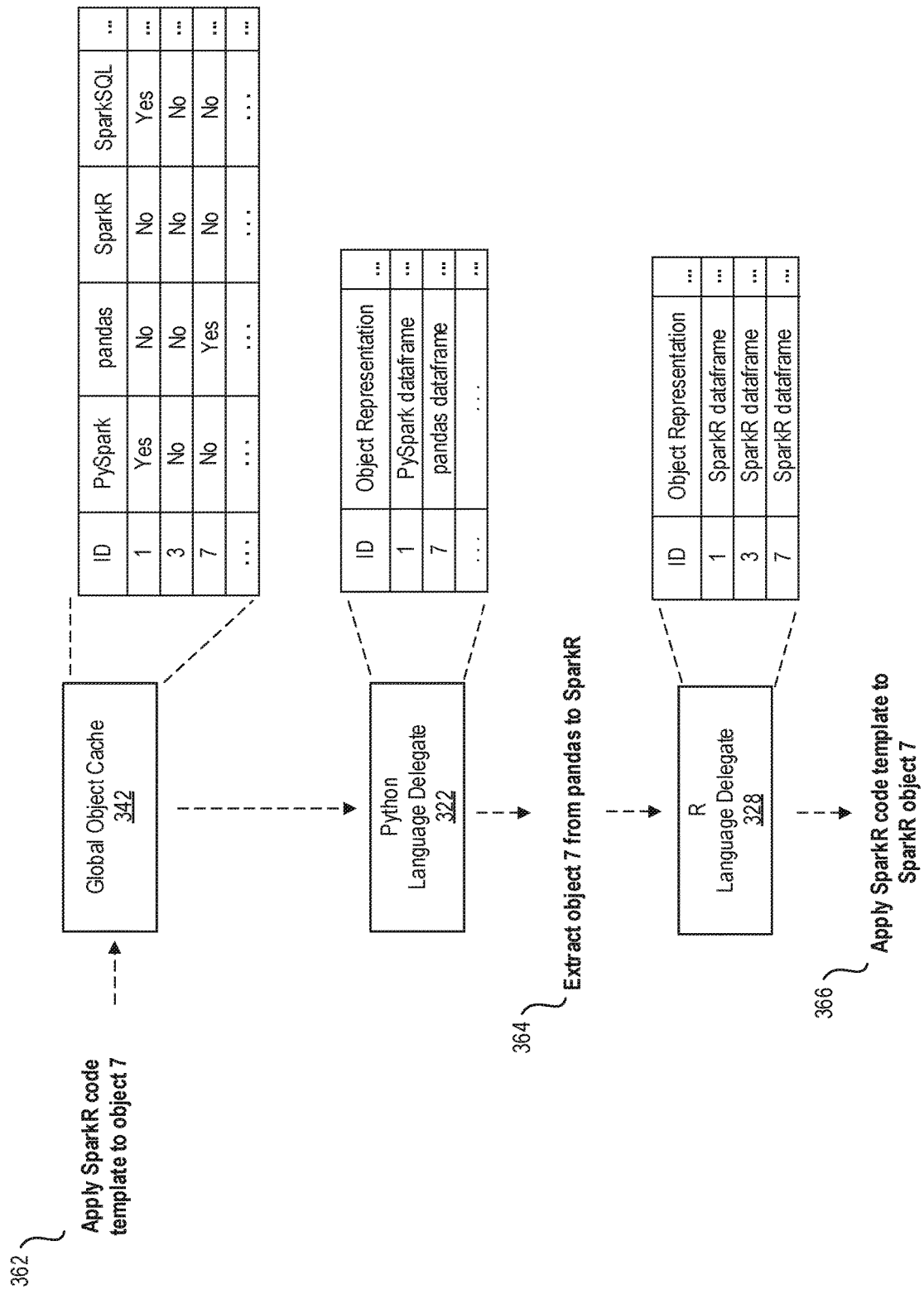

The execution engine 214 can be configured to execute workbook operations. In various embodiments, the execution engine 214 can interact with other engines included in the workbook engine 204 to execute operations. For example, a user interacting with a workbook can specify an input to be accessed as a particular type of object. For example, the user may submit a request 352 to extract an object 7 as a PySpark object, as illustrated in the example of FIG. 3D. In this example, the execution engine 214 can determine that a pandas representation of the object 7 is available. The execution engine 214 can instruct the Python language delegate 322 to extract and return the pandas object as a PySpark object 354. In another example, the user may submit a request 362 to apply a SparkR code template to an object 7, as illustrated in the example of FIG. 3E. In this example, the execution engine 214 can determine that a pandas representation of the object 7 is available. The execution engine 214 can instruct the Python language delegate 322 to extract and return the pandas object as a SparkR object 364. The extracted SparkR object can be cached by the R language delegate 328 and used when executing the transformation 366. The execution engine 214 can also interact with the object cache engine 212 to update the global object cache 342 so the extracted SparkR version of object 7 is registered and available for downstream operations.

Figure 4:
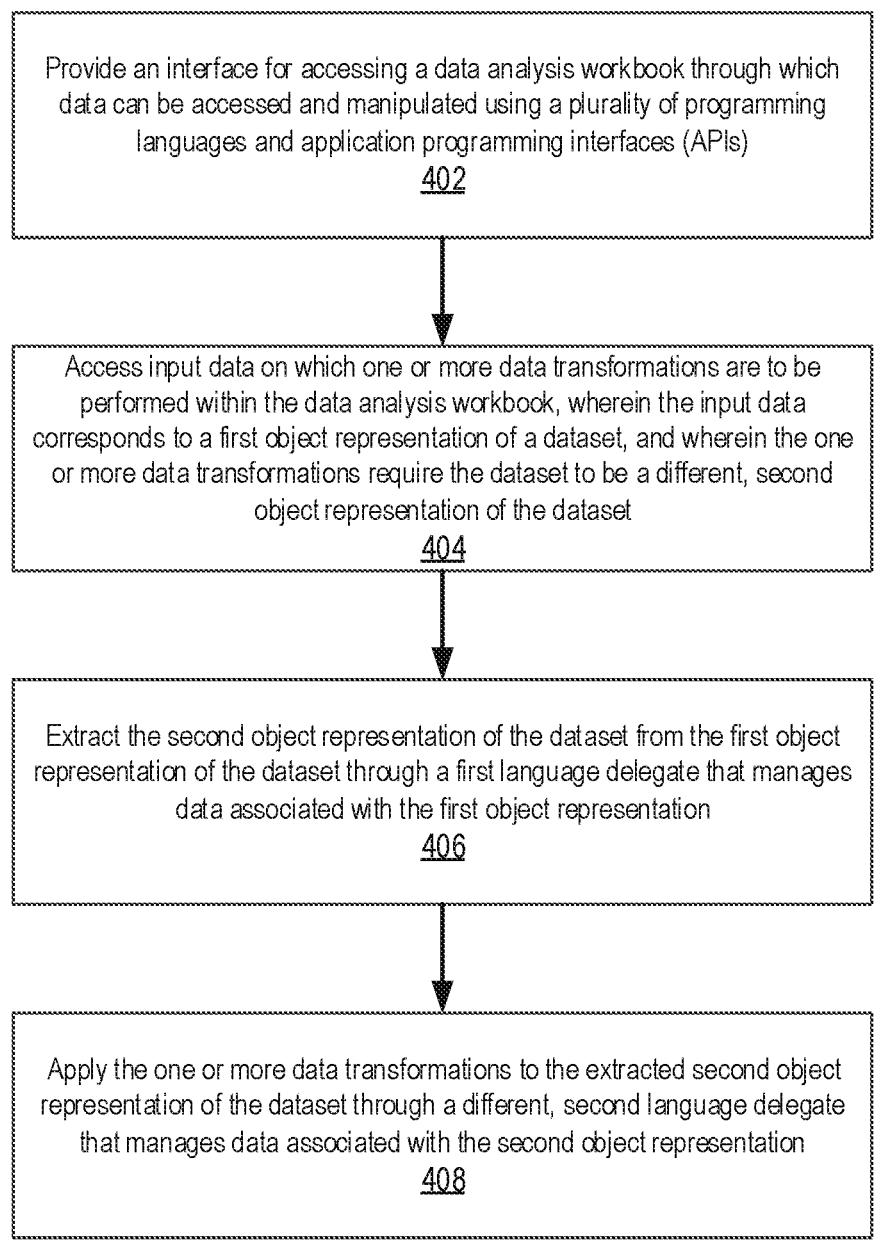
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, an interface for accessing a data analysis workbook through which data can be accessed and manipulated using a plurality of programming languages and application programming interfaces (APIs) can be provided. At block 404, input data on which one or more data transformations are to be performed within the data analysis workbook can be accessed. The input data can correspond to a first object representation of a dataset. The one or more data transformations can require the dataset to be a different, second object representation of the dataset. At block 406, the second object representation of the dataset can be extracted from the first object representation of the dataset through a first language delegate that manages data associated with the first object representation. At block 408, the one or more data transformations can be applied to the extracted second object representation of the dataset through a different, second language delegate that manages data associated with the second object representation.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
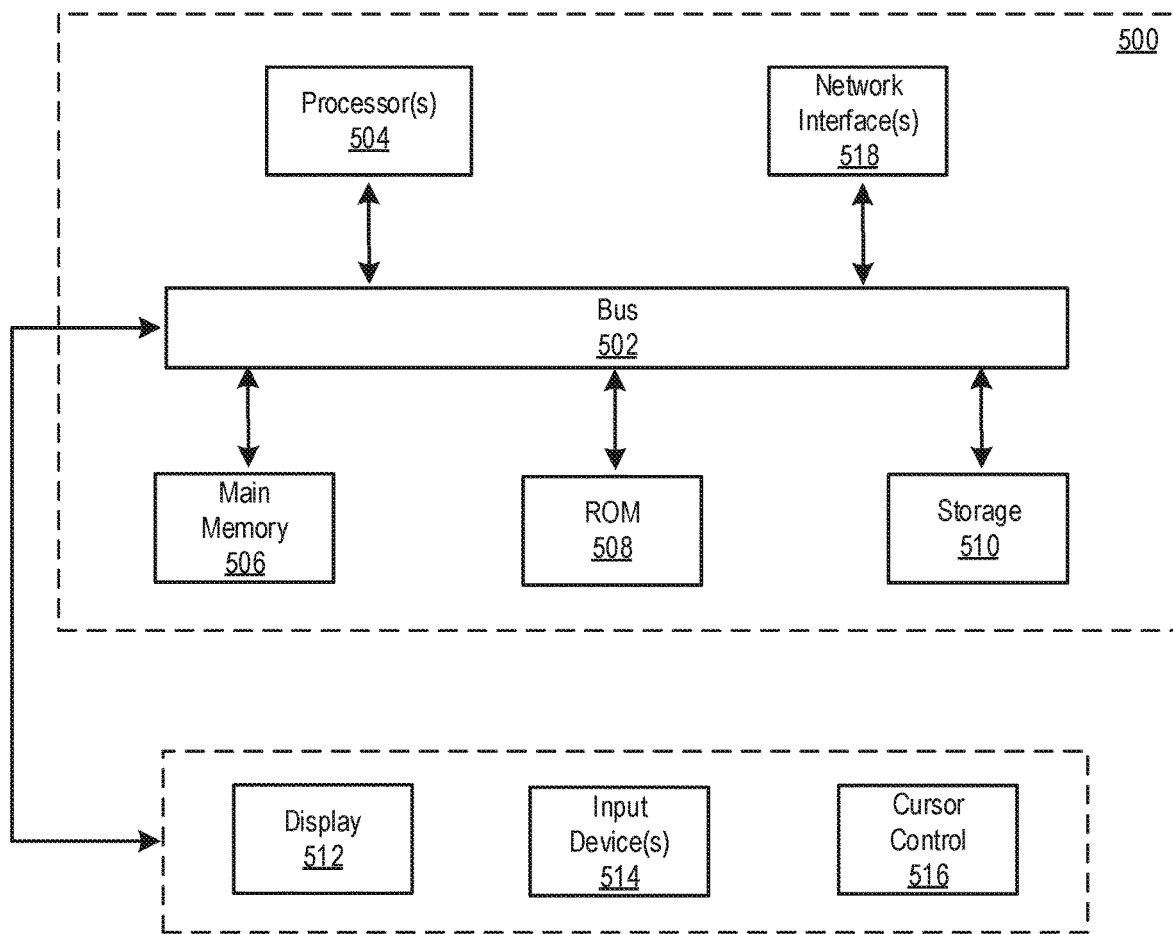
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
providing an interface for accessing a data analysis workbook through which data objects stored in a key-value datastore can be accessed and manipulated using a plurality of programming languages and application programming interfaces (APIs);
accessing, through the interface, the data objects on which one or more data transformations are to be performed within the data analysis workbook;
receiving, through the interface, a request to access an data object from the data objects in a second object representation;
extracting a first object representation of the data object from the data objects through a first language delegate, the first language delegate managing data objects associated with the first object representation, wherein extracting the first object representation of the data object comprises:
determining that the first object representation is cached by the first language delegate based at least in part on a global object cache associated with the key-value datastore; and
providing an instruction to a second language delegate to convert the first object representation to the second object representation;
applying, based on the instruction, the one or more data transformations to the first object representation through the second language delegate to convert the data object to the second object representation, the second language delegate managing data associated with the second object representation, wherein the one or more data transformations include at least applying a wrapper to the first object representation of the data object; and
updating a provenance record associated with the data object in the key-value database, wherein the provenance record includes an object identifier for the data object and indicates programming languages with which to access the data object.

2. The system of claim 1, wherein a language delegate is associated with a programming language, and wherein the language delegate is configured to cache data objects that are compatible with the programming language.

3. The system of claim 2, wherein the language delegate is configured to convert data objects that are compatible with the programming language to different data objects that are compatible with different programming languages or APIs.

4. The system of claim 1, wherein the first language delegates and the second language delegate manage different object representations of a same data object, wherein the different object representations reference a same base data object stored by the key-value datastore, and wherein the key-value datastore is a global dataset store.

5. The system of claim 1, further comprising:
providing the first object representation to the second language delegate for caching.

6. The system of claim 1, wherein the global object cache maintains information describing data objects cached by at least the first language delegate and the second language delegate.

7. The system of claim 1, wherein applying the one or more data transformations to the first object representation comprises:
providing an instruction to the second language delegate to execute the one or more data transformations based on the second object representation, wherein the second object representation is accessed from a local cache managed by the second language delegate.

8. The system of claim 1, wherein the data analysis workbook supports at least a PySpark API, a pandas API, a SparkR API, and a Spark SQL API.

9. The system of claim 1, wherein the data analysis workbook supports a Python programming language, an R programming language, and an SQL programming language.

10. The system of claim 1, wherein the interface includes a first region for visualizing and manipulating the data objects, a second region for selecting the data objects, and third region for selecting a programming language and API to access the data objects.

11. The system of claim 1, wherein providing the instruction to the second language delegate to convert the first object representation to the second object representation comprises:
issuing command to the second language delegate through a language-specific bridge.

12. The system of claim 11, wherein the language-specific bridge includes at least a Py4J to interact with a language delegate associated with Python programming language and a Gateway Server to interact with a language delegate associated with R programming language.

13. A computer-implemented method comprising:
providing, by a computing system, an interface for accessing a data analysis workbook through which data objects stored in a key-value datastore can be accessed and manipulated using a plurality of programming languages and application programming interfaces (APIs);
accessing, by the computing system, through the interface, the data objects on which one or more data transformations are to be performed within the data analysis workbook;
receiving, by the computing system, through the interface, a request to access an data object from the data objects in a second object representation;
extracting, by the computing system, a first object representation of the data object from the data objects through a first language delegate, the first language delegate managing data objects associated with the first object representation, wherein extracting the first object representation of the data object comprises:
determining that the first object representation is cached by the first language delegate based at least in part on a global object cache associated with the key-value datastore; and
providing an instruction to a second language delegate to convert the first object representation to the second object representation;
applying, by the computing system, based on the instruction, the one or more data transformations to the first object representation through the second language delegate to convert the data object to the second object representation, the second language delegate managing data associated with the second object representation, wherein the one or more data transformations include at least applying a wrapper to the first object representation of the data object; and
updating a provenance record associated with the data object in the key-value database, wherein the provenance record includes an object identifier for the data object and indicates programming languages with which to access the data object.

14. The computer-implemented method of claim 13, wherein a language delegate is associated with a programming language, and wherein the language delegate is configured to cache data objects that are compatible with the programming language.

15. The computer-implemented method of claim 14, wherein the language delegate is configured to convert data objects that are compatible with the programming language to different data objects that are compatible with different programming languages or APIs.

16. The computer-implemented method of claim 13, wherein the first language delegates and the second language delegate manage different object representations of a same data object, wherein the different object representations reference a same base data object stored by the key-value datastore, and wherein the key-value database a global dataset store.

17. A non-transitory computer readable medium comprising instructions that, when executed, cause one or more processors of a computing system to perform:
providing an interface for accessing a data analysis workbook through which data objects stored in a key-value datastore can be accessed and manipulated using a plurality of programming languages and application programming interfaces (APIs);
accessing, through the interface, the data objects on which one or more data transformations are to be performed within the data analysis workbook;
receiving, through the interface, a request to access an data object from the data objects in a second object representation;
extracting a first object representation of the data object from the data objects through a first language delegate, the first language delegate managing data objects associated with the first object representation, wherein extracting the first object representation of the data object comprises:
determining that the first object representation is cached by the first language delegate based at least in part on a global object cache associated with the key-value datastore; and
providing an instruction to a second language delegate to convert the first object representation to the second object representation;
applying, based on the instruction, the one or more data transformations to the first object representation through the second language delegate to convert the data object to the second object representation, the second language delegate managing data associated with the second object representation, wherein the one or more data transformations include at least applying a wrapper to the first object representation of the data object; and
updating a provenance record associated with the data object in the key-value database, wherein the provenance record includes an object identifier for the data object and indicates programming languages with which to access the data object.

18. The non-transitory computer readable medium of claim 17, wherein a language delegate is associated with a programming language, and wherein the language delegate is configured to cache data objects that are compatible with the programming language.

19. The non-transitory computer readable medium of claim 18, wherein the language delegate is configured to convert data objects that are compatible with the programming language to different data objects that are compatible with different programming languages or APIs.

20. The non-transitory computer readable medium of claim 17, wherein the first language delegates and the second language delegate manage different object representations of a same data object, wherein the different object representations reference a same base data object stored by the key-value datastore, and wherein the key-value database a global dataset store.

* * * * *